US012224483B2

(12) United States Patent
Li

(10) Patent No.: US 12,224,483 B2
(45) Date of Patent: Feb. 11, 2025

(54) ANTENNA ASSEMBLY AND ELECTRONIC DEVICE

(71) Applicant: VIVO MOBILE COMMUNICATION CO., LTD., Guangdong (CN)

(72) Inventor: Pengpeng Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 185 days.

(21) Appl. No.: 17/844,125

(22) Filed: Jun. 20, 2022

(65) Prior Publication Data

US 2022/0320714 A1 Oct. 6, 2022

Related U.S. Application Data

(63) Continuation of application No. PCT/CN2020/139592, filed on Dec. 25, 2020.

(30) Foreign Application Priority Data

Dec. 27, 2019 (CN) ......................... 201911374802.8

(51) Int. Cl.

*H01Q 1/24* (2006.01)
*H01Q 1/36* (2006.01)
*H01Q 1/50* (2006.01)

(52) U.S. Cl.

CPC ................ *H01Q 1/24* (2013.01); *H01Q 1/36* (2013.01); *H01Q 1/50* (2013.01)

(58) Field of Classification Search

CPC .. H01Q 1/24; H01Q 1/36; H01Q 1/50; H01Q 5/328; H01Q 5/35; H01Q 9/42; H01Q 1/243

See application file for complete search history.

(56) References Cited

U.S. PATENT DOCUMENTS 10,290,925 B2 * 5/2019 Huang ..................... H01Q 9/42
11,355,853 B2 * 6/2022 Hsu ........................ H01Q 5/328

(Continued)

FOREIGN PATENT DOCUMENTS

CN 108832296 A 11/2018
CN 109244665 A 1/2019

(Continued)

OTHER PUBLICATIONS

International Search Report and Written Opinion for Application No. PCT/CN2020/139592, dated Mar. 24, 2021, 9 pages.

(Continued)

*Primary Examiner* — Raymond R Chai
(74) *Attorney, Agent, or Firm* — BROOKS KUSHMAN P.C.

(57) ABSTRACT

An antenna assembly and an electronic device are provided. The antenna assembly includes a rectangular metal frame, where the metal frame includes an inner frame and an outer frame, a first frame of the outer frame is provided with a first gap, a second frame of the outer frame is provided with a second gap, a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap.

13 Claims, 2 Drawing Sheets

(56) References Cited

U.S. PATENT DOCUMENTS

| | | | | |
|---|---|---|---|---|
| 11,431,085 | B2 * | 8/2022 | Chen | H01Q 5/314 |
| 11,545,735 | B2 * | 1/2023 | Lee | H01Q 9/42 |
| 11,899,492 | B2 * | 2/2024 | Lin | H01Q 21/30 |
| 2018/0062244 | A1 * | 3/2018 | Huang | H01Q 5/371 |
| 2018/0358699 | A1 | 12/2018 | Li et al. | |
| 2019/0181554 | A1 | 6/2019 | Lee et al. | |
| 2021/0320392 | A1 * | 10/2021 | Hsu | H01Q 5/328 |
| 2022/0311127 | A1 * | 9/2022 | Li | H01Q 5/328 |

FOREIGN PATENT DOCUMENTS

| | | | |
|---|---|---|---|
| CN | 110165373 | A | 8/2019 |
| CN | 111029749 | A | 4/2020 |
| WO | 2017092003 | A1 | 6/2017 |

OTHER PUBLICATIONS

First Office Action for Japanese Application No. 2022-532622, dated Aug. 7, 2023, 5 Pages.

* cited by examiner

ANTENNA ASSEMBLY AND ELECTRONIC DEVICE

CROSS-REFERENCE TO RELATED APPLICATIONS

This application is a continuation of PCT International Application No. PCT/CN2020/139592 filed on Dec. 25, 2020, which claims priority to Chinese Patent Application No. 201911374802.8, filed on Dec. 27, 2019, which are incorporated herein by reference in their entireties.

TECHNICAL FIELD

The present disclosure relates to the field of communications technologies, and in particular, to an antenna assembly and an electronic device.

BACKGROUND

With the development of technologies, antenna space in electronic devices is being constantly squeezed, making it increasingly difficult to design antennas, especially to design full-band low frequency antennas.

Currently, a common solution is to design an antenna on a side frame of an electronic device, with the antenna split or not split and with one or more gaps. For low frequency antenna signals in particular, due to a requirement of electrical length, a low frequency branch part needs to be entirely disposed on the side frame. However, mounting positions need to be reserved for a power button and a volume button on the side frame of the electronic device, which restricts length of the antenna disposed on the side frame, especially length of the low frequency branch part, and in turn leads to reduced radiation efficiency of the antenna.

SUMMARY

According to a first aspect, the embodiments of the present disclosure provide an antenna assembly, including a rectangular metal frame, where the metal frame includes an inner frame and an outer frame, a first frame of the outer frame is provided with a first gap, a second frame of the outer frame is provided with a second gap, a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap, and length of the first radiation branch is less than length of the second radiation branch; where the first frame and the second frame are two adjacent frames of the outer frame, the metal connector and the second gap are both located on a side on which the second frame is located, and the metal connector is located between the second gap and the first frame.

According to a second aspect, the embodiments of the present disclosure further provide an electronic device, including the foregoing antenna assembly.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
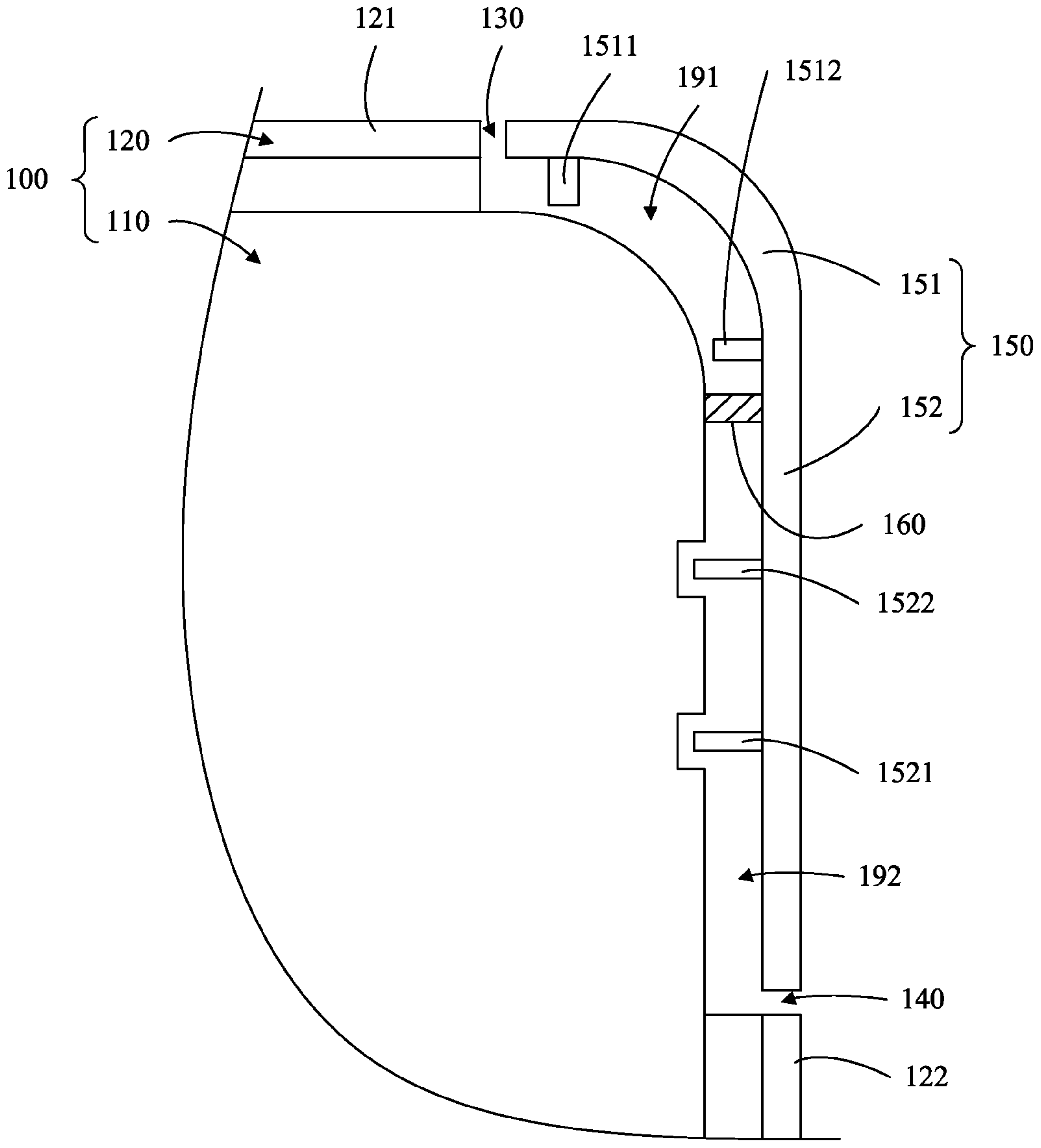
FIG. 1 is a first schematic structural diagram of an antenna assembly according to an embodiment of the present disclosure.
Figure 2:
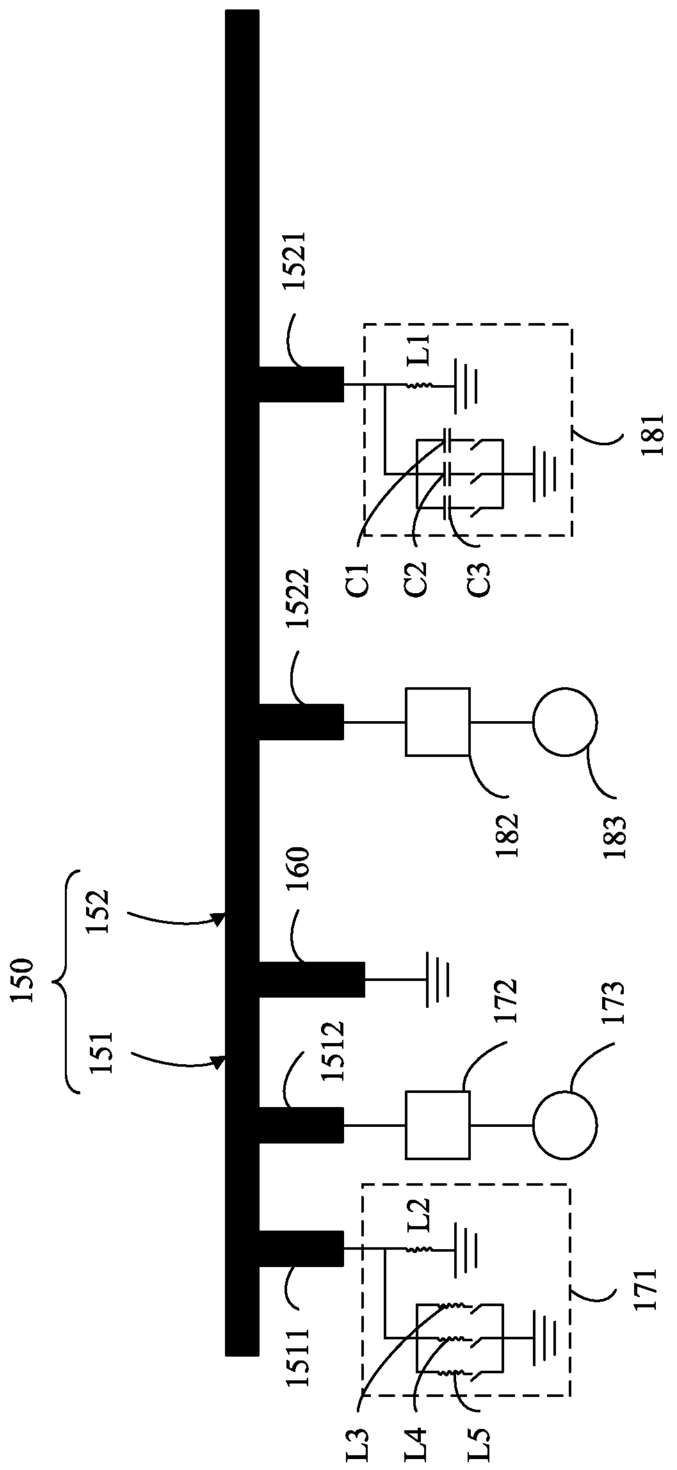
FIG. 2 is a second schematic structural diagram of an antenna assembly according to an embodiment of the present disclosure.

As shown in FIG. 1 and FIG. 2, an embodiment of the present disclosure provides an antenna assembly, including a rectangular metal frame 100. The metal frame 100 includes an inner frame 110 and an outer frame 120, a first frame 121 of the outer frame 120 is provided with a first gap 130, a second frame 122 of the outer frame 120 is provided with a second gap 140, a metal antenna 150 is formed at a part of the outer frame 120 separated between the first gap 130 and the second gap 140, the metal antenna 150 is connected to the inner frame 110 via a metal connector 160, a first radiation branch 151 is formed at a part of the metal antenna 150 between the metal connector 160 and the first gap 130, a second radiation branch 152 is formed at a part of the metal antenna 150 between the metal connector 160 and the second gap 140, and length of the first radiation branch 151 is less than length of the second radiation branch 152.

The first frame 121 and the second frame 122 are two adjacent frames of the outer frame 120, the metal connector 160 and the second gap 140 are both located on a side on which the second frame 122 is located, and the metal connector 160 is located between the second gap 140 and the first frame 121. The first frame 121 is a short side of the outer frame 120, and the second frame 122 is a long side of the outer frame 120.

In this implementation, the metal antenna 150 is connected to the inner frame 110 via the metal connector 160. Because the inner frame 110 is equivalent to a grounding terminal, the metal connector 160 is equivalent to a shared grounding terminal between the first radiation branch 151 and the second radiation branch 152. In addition, because the length of the second radiation branch 152 is greater than the length of the first radiation branch 151, and an end of the second radiation branch 152 at the second gap 140 is disposed facing downward, an intrinsic mode of the inner frame 110 is excited, to allow the inner frame 110 to participate in radiation, thereby greatly improving radiation efficiency of the antenna assembly.

Optionally, length of the first frame 121 is less than length of the second frame 122, that is, the first frame 121 is a short frame of the outer frame 120, and the second frame 122 is a long frame of the outer frame 120. In this way, the longer second radiation branch 152 is disposed on a side of the longer second frame 122, thereby effectively increasing distribution space of the second radiation branch 152. In addition, the second gap 140 of the second radiation branch 152 is disposed facing downward, to excite the intrinsic mode of the inner frame 110 and allow the inner frame 110 to participate in the radiation, thereby improving the radiation efficiency of the second radiation branch 152 without increasing the length of the second radiation branch 152, and also facilitating arrangement of side buttons on an electronic device.

The first radiation branch 151 may be a medium-high frequency radiation branch of the antenna assembly, and the second radiation branch 152 may be a low frequency radiation branch of the antenna assembly. According to the solution provided in the present disclosure, the second gap 140 of the second radiation branch 152 is disposed facing downward, to excite the intrinsic mode of the inner frame 110 and allow the inner frame 110 to participate in radiation. In this way, the efficiency of the antenna assembly can be increased by about 3 dB, and the full-band efficiency at low frequency is about −7 dB. Moreover, with a solution of high and low frequency separation, the antenna assembly provided in the present disclosure can meet full-band requirements of 696 MHz to 960 MHz and 1710 MHz to 2690 MHz, achieve a high isolation between radiation branches, and meet product engineering requirements.

A first spacing 191 is present between the first radiation branch 151 and the inner frame 110, and a second spacing 192 is present between the second radiation branch 152 and the inner frame 110. A clearance area is formed between the first radiation branch 151 and the inner frame 110 and between the second radiation branch 152 and the inner frame 110 by disposing the first spacing 191 and the second spacing 192, so as to improve the radiation efficiency of the antenna assembly.

Optionally, the antenna assembly further includes a first grounding switch circuit 171, a first matching circuit 172, and a first feed source 173, and the first radiation branch 151 is provided with a first switch connecting portion 1511 and a first feed source connecting portion 1512. The first switch connecting portion 1511 is electrically connected to the first grounding switch circuit 171, and the first feed source connecting portion 1512 is electrically connected to the first feed source 173 via the first matching circuit 172.

The first switch connecting portion 1511 is located at an end of the first radiation branch 151 closer to the first gap 130, and the first feed source connecting portion 1512 is located between the first switch connecting portion 1511 and the metal connector 160.

Optionally, the antenna assembly further includes a second grounding switch circuit 181, a second matching circuit 182, and a second feed source 183, and the second radiation branch 152 is provided with a second switch connecting portion 1521 and a second feed source connecting portion 1522. The second switch connecting portion 1521 is electrically connected to the second grounding switch circuit 181, and the second feed source connecting portion 1522 is electrically connected to the second feed source 183 via the second matching circuit 182.

The second switch connecting portion 1521 is located at an end of the second radiation branch 152 closer to the second gap 140, and the second feed source connecting portion 1522 is located between the second switch connecting portion 1521 and the metal connector 160.

In the foregoing embodiment, the first grounding switch circuit 171 may include an inductor L3/L4/L5, and the second grounding switch circuit 181 may include a capacitor C1/C2/C3. The first radiation branch 151 may be excited by the first feed source 173, and the second radiation branch 152 may be excited by the second feed source 183.

Antenna bands may be implemented as follows:

when the first grounding switch circuit 171 is in an off state, an antenna resonator is in mode B3, and switching to the inductor L3/L4/L5 can implement coverage of a band B1/B40/B41; and when the second grounding switch circuit 181 is in an off state, an antenna resonator is in mode B8, and switching to the capacitor C1/C2/C3 can implement coverage of a band B5/B20/B28.

In a specific implementation of the antenna assembly provided in the embodiments of the present disclosure, for the metal frame 100 with a width of 73 millimeters and a length of 157 millimeters, dimensions of various parts of the antenna assembly are designed as follows:

a gap size of each of the first gap 130 and the second gap 140 is 1 millimeter;

width of the metal connector 160 is 1.5 millimeters;

the length of the first radiation branch 151 is 29 millimeters, where distance between the first switch connecting portion 1511 and the first gap 130 is 3.5 millimeters, distance between the first switch connecting portion 1511 and the first feed source connecting portion 1512 is 23.5 millimeters, and distance between the first feed source connecting portion 1512 and the metal connector 160 is 2 millimeters;

the length of the second radiation branch 152 is 44.5 millimeters, where distance between the second switch connecting portion 1521 and the second gap 140 is 17 millimeters, distance between the second switch connecting portion 1521 and the second feed source connecting portion 1522 is 11.5 millimeters, and distance between the second feed source connecting portion 1522 and the metal connector 160 is 17 millimeters; and width of the second spacing 192 is 1.5 millimeters, where when the antenna assembly is mounted to the device, the second spacing 192 can be shortened to 0.5 millimeter due to presence of a display screen.

In the antenna assembly provided in the embodiments of the present disclosure, the second gap 140 of the second radiation branch 152 is disposed facing downward, to excite the intrinsic mode of the inner frame 110 and allow the inner frame 110 to participate in radiation, thereby greatly improving the radiation efficiency of the antenna assembly.

An embodiment of the present disclosure further provides an electronic device, including the foregoing antenna assembly.

To address an issue of low radiation efficiency of an existing antenna assembly, in embodiments of the present disclosure, the antenna assembly includes a rectangular metal frame, where the metal frame includes an inner frame and an outer frame, a first frame of the outer frame is provided with a first gap, a second frame of the outer frame is provided with a second gap, a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap, and length of the first radiation branch is less than length of the second radiation branch; where the first frame and the second frame are two adjacent frames of the outer frame, the metal connector and the second gap are both located on a side on which the second frame is located, and the metal connector is located between the second gap and the first frame. In this way, the second gap of the second radiation branch is disposed facing downward, to excite an intrinsic mode of the inner frame and allow the inner frame to participate in radiation, thereby greatly improving the radiation efficiency of the antenna assembly.

It should be noted that the implementations in the embodiments of the antenna assembly are also applicable to the embodiments of the electronic device, with the same technical effects achieved. Details are not described herein again.

The embodiments of the present disclosure are described above with reference to the accompanying drawings, but the present disclosure is not limited to the embodiments. The foregoing specific embodiments are merely illustrative rather than restrictive. Inspired by the present disclosure, a person of ordinary skill in the art can still derive a plurality of variations without departing from the essence of the present disclosure and the protection scope of the claims, and all these variations shall fall within the protection scope of the present disclosure.

What is claimed is:

1. An antenna assembly, comprising: a rectangular metal frame, wherein the metal frame comprises an inner frame and an outer frame surrounding the inner frame, a first frame of the outer frame is provided with a first gap, a second frame of the outer frame is provided with a second gap, a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap, and length of the first radiation branch is less than length of the second radiation branch; wherein the first frame and the second frame are two adjacent frames of the outer frame, the metal connector and the second gap are both located on a side on which the second frame is located, and the metal connector is located between the second gap and the first frame; and wherein length of the first frame is less than length of the second frame;

wherein the antenna assembly further comprises: a first grounding switch circuit, a first matching circuit, and a first feed source;

the first radiation branch is provided with a first switch connecting portion and a first feed source connecting portion, wherein the first switch connecting portion is electrically connected to the first grounding switch circuit, and the first feed source connecting portion is electrically connected to the first feed source via the first matching circuit;

the antenna assembly further comprises: a second grounding switch circuit, a second matching circuit, and a second feed source, the second feed source being different from the first feed source; and the second radiation branch is provided with a second switch connecting portion and a second feed source connecting portion, wherein the second switch connecting portion is electrically connected to the second grounding switch circuit, and the second feed source connecting portion is electrically connected to the second feed source via the second matching circuit.

2. The antenna assembly according to claim 1, wherein the first switch connecting portion is located at an end of the first radiation branch closer to the first gap, and the first feed source connecting portion is located between the first switch connecting portion and the metal connector.

3. The antenna assembly according to claim 1, wherein the second switch connecting portion is located at an end of the second radiation branch closer to the second gap, and the second feed source connecting portion is located between the second switch connecting portion and the metal connector.

4. The antenna assembly according to claim 1, wherein the first radiation branch is a medium-high frequency radiation branch for a frequency band from 1710 MHz to 2690 MHz.

5. The antenna assembly according to claim 1, wherein the second radiation branch is a low frequency radiation branch for a frequency band from 696 MHz to 960 MHz.

6. The antenna assembly according to claim 1, wherein a first spacing is present between the first radiation branch and the inner frame, and a second spacing is present between the second radiation branch and the inner frame.

7. An electronic device, comprising an antenna assembly, wherein, the antenna assembly comprises: a rectangular metal frame, wherein the metal frame comprises an inner frame and an outer frame surrounding the inner frame, a first frame of the outer frame is provided with a first gap, a second frame of the outer frame is provided with a second gap, a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap, and length of the first radiation branch is less than length of the second radiation branch; wherein the first frame and the second frame are two adjacent frames of the outer frame, the metal connector and the second gap are both located on a side on which the second frame is located, and the metal connector is located between the second gap and the first frame; and wherein length of the first frame is less than length of the second-frame frame;

wherein the antenna assembly further comprises: a first grounding switch circuit, a first matching circuit, and a first feed source;

the first radiation branch is provided with a first switch connecting portion and a first feed source connecting portion, wherein the first switch connecting portion is electrically connected to the first grounding switch circuit, and the first feed source connecting portion is electrically connected to the first feed source via the first matching circuit;

the antenna assembly further comprises: a second grounding switch circuit, a second matching circuit, and a second feed source, the second feed source being different from the first feed source; and the second radiation branch is provided with a second switch connecting portion and a second feed source connecting portion, wherein the second switch connecting portion is electrically connected to the second grounding switch circuit, and the second feed source connecting portion is electrically connected to the second feed source via the second matching circuit.

8. The electronic device according to claim 7, wherein the first switch connecting portion is located at an end of the first radiation branch closer to the first gap, and the first feed source connecting portion is located between the first switch connecting portion and the metal connector.

9. The electronic device according to claim 7, wherein the second switch connecting portion is located at an end of the second radiation branch closer to the second gap, and the second feed source connecting portion is located between the second switch connecting portion and the metal connector.

10. The electronic device according to claim 7, wherein the first radiation branch is a medium-high frequency radiation branch for a frequency band from 1710 MHz to 2690 MHz.

11. The electronic device according to claim 7, wherein the second radiation branch is a low frequency radiation branch for a frequency band from 696 MHz to 960 MHz.

12. The electronic device according to claim 7, wherein a first spacing is present between the first radiation branch and the inner frame, and a second spacing is present between the second radiation branch and the inner frame.

13. An antenna assembly, comprising:

a rectangular metal frame, wherein the metal frame comprises an inner frame and an outer frame surrounding the inner frame, a first frame of the outer frame is provided with a first gap, a second frame of the outer frame is provided with a second gap, wherein the first frame and the second frame are two adjacent frames of the outer frame, and length of the first frame is less than length of the second frame;

wherein a metal antenna is formed at a part of the outer frame separated between the first gap and the second gap, the metal antenna is connected to the inner frame via a metal connector, a first radiation branch is formed at a part of the metal antenna between the metal connector and the first gap, a second radiation branch is formed at a part of the metal antenna between the metal connector and the second gap, and length of the first radiation branch is less than length of the second radiation branch;

wherein the metal connector and the second gap are both located on a side on which the second frame is located, and the metal connector is located between the second gap and the first frame;

wherein the antenna assembly further comprises a first grounding switch circuit, a first matching circuit, and a first feed source, wherein the first radiation branch is provided with a first switch connecting portion and a first feed source connecting portion, wherein the first switch connecting portion is electrically connected to the first grounding switch circuit, and the first feed source connecting portion is electrically connected to the first feed source via the first matching circuit; and wherein the first grounding switch circuit comprises a first inductor, a second inductor and a third inductor; wherein the antenna assembly implements a coverage of a band B3 in a case that the first grounding switch circuit is in an off state; and a coverage of a band B1, a coverage of a band B40, and a coverage of a band B41 is implemented by switching the first inductor, the second inductor and the third inductor, respectively;

wherein the antenna assembly further comprises a second grounding switch circuit, a second matching circuit, and a second feed source, the second feed source being different from the first feed source, wherein the second radiation branch is provided with a second switch connecting portion and a second feed source connecting portion, wherein the second switch connecting portion is electrically connected to the second grounding switch circuit, and the second feed source connecting portion is electrically connected to the second feed source via the second matching circuit; and wherein the second grounding switch circuit comprises a first capacitor, a second capacitor and a third capacitor; wherein the antenna assembly implements a coverage of a band B8 in a case that the second grounding switch circuit is in an off state; and a coverage of a band B5, a coverage of a band B20, and a coverage of a band B28 is implemented by switching the first capacitor, the second capacitor and the third capacitor, respectively.

* * * * *